United States Patent [19]

Aikawa et al.

[11] Patent Number: 4,959,834
[45] Date of Patent: Sep. 25, 1990

[54] WORD SYNCRONIZATION SYSTEM AND METHOD

[75] Inventors: Satoru Aikawa; Yoichi Saito, both of Kanagawa, Japan

[73] Assignee: Nippon Telegraph and Telephone Corporation, Tokyo, Japan

[21] Appl. No.: 309,587

[22] Filed: Feb. 13, 1989

[30] Foreign Application Priority Data

Feb. 13, 1988 [JP] Japan ................................. 63-31137

[51] Int. Cl.$^5$ ............................................ G06F 11/10
[52] U.S. Cl. .................................... 371/47.1; 375/118
[58] Field of Search .......................... 371/47.1, 42, 46; 375/108, 111, 118; 364/200 MS File, 900 MS File

[56] References Cited

U.S. PATENT DOCUMENTS

| | | | |
|---|---|---|---|
| 3,466,601 | 9/1969 | Tong | 371/42 |
| 4,580,279 | 4/1986 | Kahn | 375/118 |
| 4,737,971 | 4/1988 | Lanzafame | 375/118 |
| 4,870,646 | 9/1989 | Maeda | 371/42 |

*Primary Examiner*—Jerry Smith
*Assistant Examiner*—Robert W. Beausoliel
*Attorney, Agent, or Firm*—Cushman, Darby & Cushman

[57] ABSTRACT

A word synchronization system which receives signals with error corrections codes to calculate a syndrome indicative of a synchronization of an intial phase. The initial phase is changed when the calculated syndrome is not zero, and the syndrome is recalculated. This operation is repeated until the particular syndrome becomes zero for the sequence of M times (or the number of testing stages). A synchronization slip detecting circuit judges a slip out of synchronization without the necessity to wait for the repetition of the state for M times, to thereby enable prompt phase resetting or synchronization establishment.

8 Claims, 11 Drawing Sheets

WORD SYNCRONIZATION SYSTEM AND METHOD

FIELD OF THE INVENTION

This invention relates to digital communications. More particularly, the present invention relates to detection of a slip in word synchronization of signals which are encoded including forward error correction codes.

BACKGROUND AND SUMMARY OF THE INVENTION

The basic structure of a prior art word synchronization circuit is shown in FIG. 13. In the figure, a syndrome calculating circuit 100 calculates a so-called syndrome of input data on a word by word basis, based on word synchronization signals output from a word counter 102. An error pulse E is output whenever the calculated syndrome is not zero. A testing circuit 103 receives the error pulse E as input. When the error pulses E are output continuously for the N stages of a predetermined sync-in testing circuits, the circuit 103 determines the situation as one where the word synchronization has not yet been established. The phase 0 of the word counter 102 is then shifted by one bit. The testing circuit 103 determines that, when the syndrome calculated by the syndrome calculating circuit 100 stays zero for a sequence of M times, a word synchronization has been established.

The above operation can be expressed numerically as follows. More particularly, the received signals can be expressed as a polynomial as follows:

$$R_0(X) = a_0 X^{n-1} + a_1 X^{n-2} + \ldots + a_{n-2} X + a_{n-1} \quad \ldots (1)$$

wherein the received signals are represented by $$\ldots a_{-2}, a_{-1}, a_0, a_1, a_2, \ldots a_{n-n}, a_n \ldots$$

and signals of a correct block by $$a_0, a_1, \ldots a_{n-1}.$$

where the symbol + represents the addition which occurs in modules 102 herein. A polynomial representation $R_k(X)$, of a received signal which is slipped, or out-of-phase by k bits then becomes as follows:

$$R_k(X) = a_k X^{n-1} + a_{k+1} X^{n-2} + a_{n+k-1} X + a_{n+k-1} \quad \ldots (2)$$

If it is assumed that the root of a generator polynomial $G(X) = 0$ is a, a, the value of the syndrome can be obtained by substituting $X = \alpha$ in the receiver polynomial. Therefore, the syndrome at the correct initial phase becomes as follows:

$$\begin{aligned} S_0 &= R_0(\alpha) \\ &= a_0 \alpha^{n-1} + a_1 \alpha^{n-2} + \ldots + a_{n-2}\alpha + a_{n-1} = 0 \end{aligned} \quad (3)$$

The syndrome at the initial phase, slipped by one bit, can be obtained from the expression below.

$$\begin{aligned} S_{+1} &= R_{+1}(\alpha) \\ &= a_1 \alpha^{n-1} + a_2 \alpha^{n-2} + \ldots + a_{n-1}\alpha\, a_n \\ &= R_0(\alpha)\alpha + an + a_6\alpha^n \\ &= R_0(\alpha)\alpha + (a_n + a_0)(\alpha^n = 1) \\ &= (a_n + a_0)^0 \end{aligned} \quad (4)$$

When $a_n = a_0$, the syndrome becomes zero. Similarly, syndromes at phases which have slipped by one or two bits can be expressed as below.

$$S_{-1} = (a_{-1} + a_{n-1})\alpha^{n-1} \quad (5)$$

$$S_{-2} = (a_{-2} + a_{n-2})\alpha^{n-2} + (a_{-1} + a_{n-1})\alpha^{n-2} \quad (6)$$

$$S_{+2} = (a_0 + a_n)\alpha^1 + (a_1 + a_{n+1})\alpha^0 \quad (7)$$

Therefore, when the initial phase has slipped in either direction by one or two bits, the probabilities of the syndrome being zero are $\frac{1}{2}$ and $\frac{1}{4}$ respectively. The word synchronization is established when a word with a syndrome of zero continues for the sequence of M times, as sync-in testing circuits are generally provided in a word synchronization circuit. Accordingly, synchronization slips at the probabilities of $(\frac{1}{2})^M$, $(\frac{1}{4})^M$, ...

When synchronization slip occurs, the error pulses are counted by a sync-out testing circuit according to the prior art circuit structure, and the error pulses are generated for the sequence of N times. The situation leads to a determination that the synchronization has been lost, and the word synchronization is reset once again.

However, the prior art method is detrimental in that when N is a large number, that is the sequence of N times is very long, synchronization slip can be detected only after it is repeated N times in the process of establishing synchronization. This effectively increases the time needed for synchronization slip detection. It further prolongs the time needed for recovery of normal operation. If the number of times N is made excessively small, on the other hand, even if synchronization has been established, bit errors may be erroneously detected as synchronization slip, and cause re-initiation of the process of establishing synchronization, to disturbing the actually stable synchronization.

The present invention aims to solve the above-mentioned problems encountered in the prior art, and to provide a word synchronization system which can detect the conditions of synchronization slip, if occurring, as well and as quickly and merely is less likely to detect a synchronization slip if a small number of bit errors are caused in transmission signals.

A first aspect of this invention defines a word synchronization system with a syndrome calculating circuit which receives encoded signals including forward error correction codes and calculates a syndrome from an initial phase. A controlling means changes the initial phase of the circuit when the syndrome calculated by said circuit is not zero and again calculates the syndrome. When the syndrome becomes zero, the system calculates the syndrome from the same initial phase by a sync-in testing circuit. The operation is repeated until the time the syndrome becomes zero for the sequence of M times to establish synchronization.

A synchronization slip detecting circuit is provided for outputting signals for slipping and judges that word synchronization has been lost when it detects a particular syndrome after synchronization has been established for more than $K_0$ times in the sequence of K items ($K_0 \leq K \leq M$).

The particular syndrome as used herein is a syndrome which is not zero and in which an error pulse appears at the first bit of a word.

The second aspect of this invention defines a word synchronization system which synchronizes words commonly for the signals from m plural systems having the same initial phases comprising one each circuit for m systems which receives encoded signals having the same initial phases and including forward error correction codes to calculate the syndrome from one initial phase. The initial phase is changed when the syndrome calculated by the circuit is not zero until the time the syndrome is continuously zero for the sequence of M times, and a means which issues word synchronization pulses when the syndrome is continuously zero for the sequence of M times and which is provided one each for m systems. A synchronization slip detecting circuit outputs signals indicative of a slip in the word synchronization when the syndrome of all the systems or all the m systems become a particular syndrome.

The third aspect of this invention lies in a system for word synchronization which can synchronize signals respectively for the plural m systems having initial phases identical to each other. A circuit receives encoded signals including error correction codes of plural systems having identical initial phases to each other, and the initial phase is changed when the calculated syndrome is not zero until the syndrome becomes zero for the sequence of M times. Word synchronization pulses are issued when the syndrome becomes zero for the sequence of M times, the above circuits being provided one for each of the systems respectively. The invention system has a synchronization slip detecting circuit which detects whether or not the phases of all the word synchronization pulses are identical to each other in all of the m systems. If not identical signals indicative of slipping of word synchronization are produced.

The fourth aspect of this invention is a system which employs Gray codes and which comprises a circuit for receiving multi-value signals which have been separately encoded into codes for each system with error correction codes and further encoded into Gray codes and which calculates the syndrome from one initial phase. A controlling means changes the initial phase of the circuit if the calculated syndrome is not zero, calculates it once more, and repeats the operation until the syndrome becomes zero for the sequence of M times. A synchronization slip detecting circuit which includes a gate circuit to detect synchronized generation of error pulse signals for indicating the positions of code errors in respective systems, and a testing counter which outputs signals for slipping in the word synchronization when the output from the above circuit is detected for more than $K_0$ times in the sequence of K ($K_0 \leq K$).

A method of operating such a device is also contemplated.

Using the signal indicative slipping in word synchronization mentioned above, it becomes possible to change the initial phase or to reset the word synchronization, or both.

According to this invention, secured performance is guaranteed even if the number of stages, M, is set as a large number, and since a synchronization slip detecting circuit is provided separately, the judgement of the synchronization slip can be made quickly without the necessity of waiting for the M time repetition to immediately proceed to the phase reset or synchronization step. As it is least likely for the synchronization slip detecting circuit to judge bit errors in transmission of signals as a synchronization slip, stable synchronization can be maintained.

BRIEF DESCRIPTION OF THE DRAWINGS

These and other aspects of the invention will now be described with reference to the accompanying drawings wherein.

DESCRIPTION OF THE EMBODIMENTS

Figure 1:
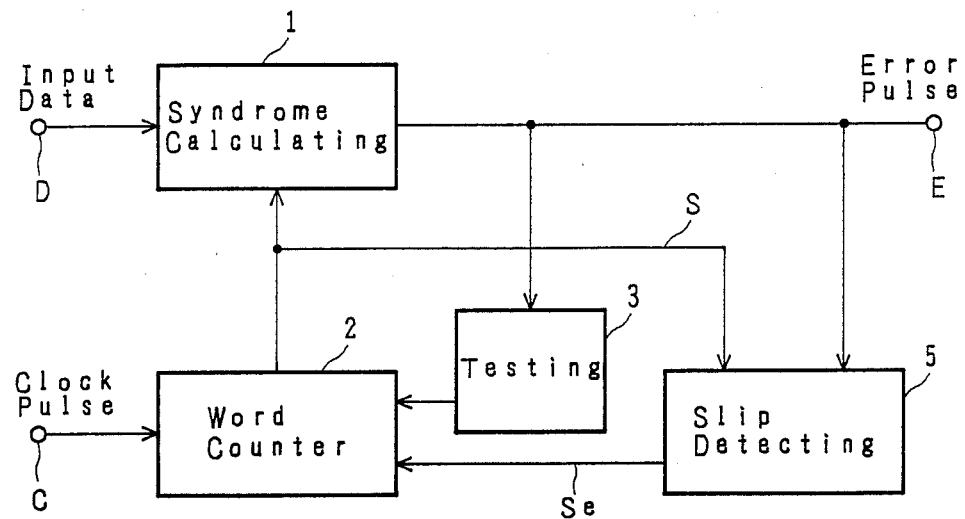
FIG. 1 is a block diagram to show the first embodiment of this invention (in correspondence to said first aspect of this invention).

FIG. 1 shows a block diagram of the first embodiment of this invention circuit. The circuit includes a syndrome calculating circuit 1, which inputs encoded signals with error correction codes that appear at a terminal D and calculates a syndrome from one initial phase. A testing circuit 3 performs as a controlling means, and receives an error pulse from a line attached to a terminal E when the calculated syndrome by the above circuit is not a value indicative of synchronization in this case zero (0). The error pulse is the pulse to be issued at the timing of an error, and changes current phase of the syndrome calculating circuit 1. Another syndrome is calculated with the new phase, and the circuit repeats this operation until the syndrome becomes zero for the entire sequence of M times. The circuit according to this embodiment also has a synchronization slip detecting circuit 5 to output signals indicative of a slip in the word syndrome Se, when a particular syndrome appears in the output from said syndrome calculating circuit for more than a Ke time during any sequence of K times ($K_0 \leq K \leq M$).

Figure 2:
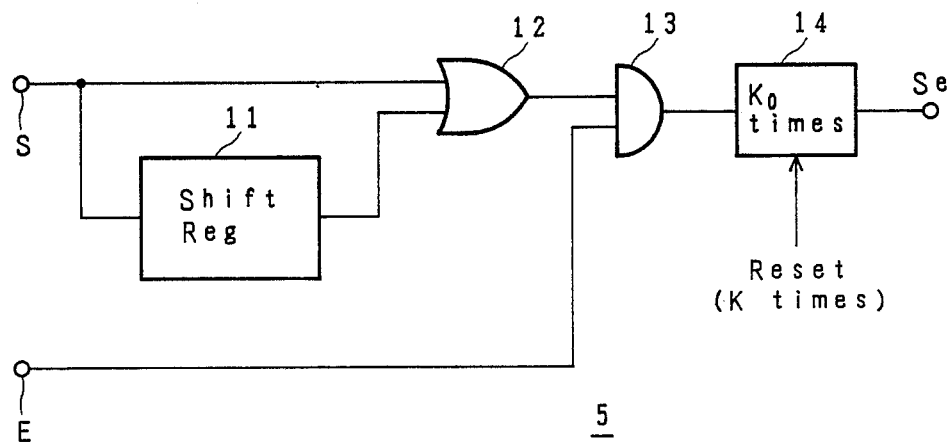
FIG. 2 is a circuit diagram to show an embodiment of structure of a synchronization slip detecting circuit thereof.

FIG. 2 is a structural view of the synchronization slip detecting circuit 5 which receives as input the word synchronization pulse S, output from the word counter 2 and an error pulse E indicative of an error occurrence from the syndrome calculating device 1, which is calculated for a word based on one phase of the syndrome calculating circuit The word synchronization pulse S is delayed by one bit by shift register 11 and together with the original word synchronization pulse S is input to both terminals of an OR gate 12. The output from the OR gate 12 is input to an AND gate 13 together with the error pulse E, and the output therefrom is sent out as a synchronization slip decision output Se via a testing counter 14. The testing counter 14 is reset every time the syndrome calculating circuit 1 executes the calculation of the syndrome for K times, and sends out its outputs when the counted number reaches Ke. The counter 14 is adapted to prevent misjudgment of the errors which are caused in the first or the last bit of a block when synchronization has been normally established. During normal synchronization, the probability of error generation at the first or the last bit is 2r (where r is an error rate). If synchronization slip detecting signals are made to issue only when an error occurs in either the first or the last bit in a block for the sequence of K times by employing the counter 14, the probability of such a signal can be reduced to $(2r)^k$ in normal synchronization.

Figure 3:
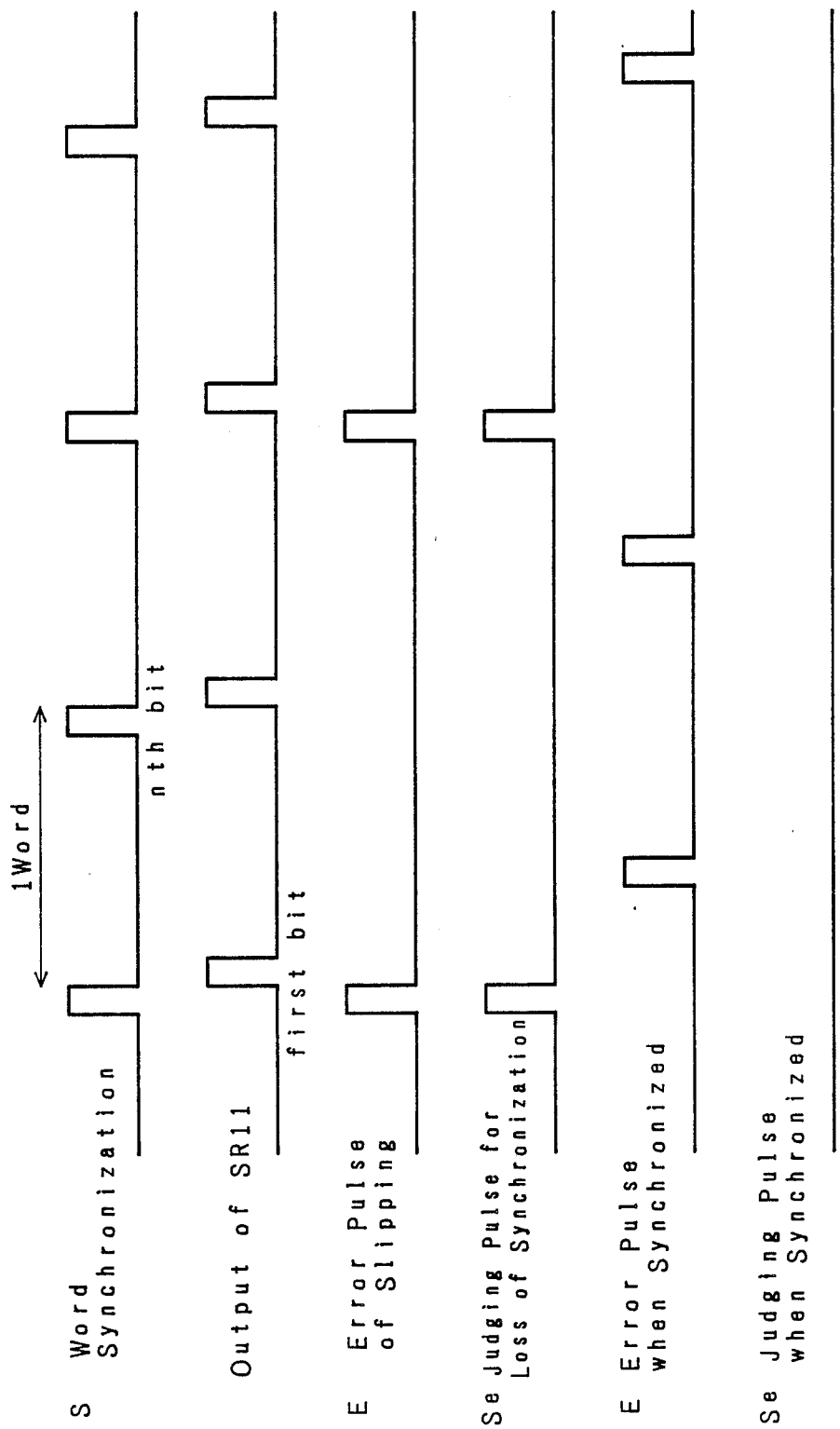
FIG. 3 is a chart of waveforms to explain the operation of this circuit.

FIG. 3 is an explanatory view of the performance of the synchronization slip detecting circuit 5. For facilitating understanding, it is assumed herein that the following relation holds:

$K = K_0 = 1$

More particularly, the testing counter 14 is omitted, and the output from the AND 13 is designated as a synchronization slip decision output Se. The word synchronization pulse S is a signal generated at the nth bit or the last bit of each block, and is shifted by one bit when output from the shift register 11. In other words, the signal appears at the first bit of each block. Error pulse E occurs at the first bit or the last bit when synchronization has slipped. Therefore, synchronization slip output Se is produced at the output of the AND gate 13. On the other hand, even if a bit error is caused in the transmitted signals when normal synchronization has been established, and an error pulse is output from the syndrome calculating circuit 1, the possibility of the error pulse generating being at the first bit is as small as 2/n, and it occurs at a random position as shown in FIG. 3. The error pulse therefore rarely appears at the AND gate 13, and never appears at the synchronization slip decision output Se'. Therefore, by using the synchronization slip detecting circuit 5, the slip can be detected immediately, and, moreover, the probability of misjudgment becomes as small as 2/n times of the transmission error rate when the syndrome becomes other than zero by a bit error instead of a synchronization slip.

As the error pulses due to synchronization slip appear repeatedly at the first bit or the last bit while the error pulses due to the bit error do not appear repeatedly, the two types of errors become more effectively distinguishable if appropriate values K and $K_0$ are set at the testing counter 14.

When a synchronization slip decision output Se is output, the word counter 2 executes one of the following two operations; the first method being to change the initial phase (e.g. shifting one bit), and the second method being to set word synchronization by resetting the order counter. Both methods may be executed simultaneously.

As the method to shift bits one by one is used generally in the word synchronization systems, and synchronization slip often occurs one bit before the initial phase, the first method is 15 superior to the second method as it can establish synchronization more quickly.

The system can judge whether synchronization slip occurs one bit before or one bit after according to the timing of the error pulse. The synchronization can therefore be established still faster if the initial phase is shifted one bit after when the error pulse is positioned at the first bit of the block, and is shifted one bit before when the error pulse generates at the last bit of the block.

When the word synchronization pulse occurs at the first bit of a block, the timing of the last bit can be obtained by shifting the pulse by (n−1) bit. In this case, it is advantageous to construct the system in a manner that error pulses can be shifted in units of one bit.

It is also possible to detect a synchronization slip directly from the syndrome value, instead of using error pulses. A case where the generator polynomial on the GF (2) is expressed as below is exemplified to describe BCH codes.

$1 + X + X^4$

If it is assumed that the root of the generator polynomial is $\alpha$, the vector representations of $\alpha^0 = 1$, $\alpha^{(n-1)} = \alpha^{14}$ become $(1000)_B$ and $(1001)_B$ respectively. Therefore, by detecting the syndrome thereof, the synchronization slip can be directly detected without using error pulses.

Figure 4:
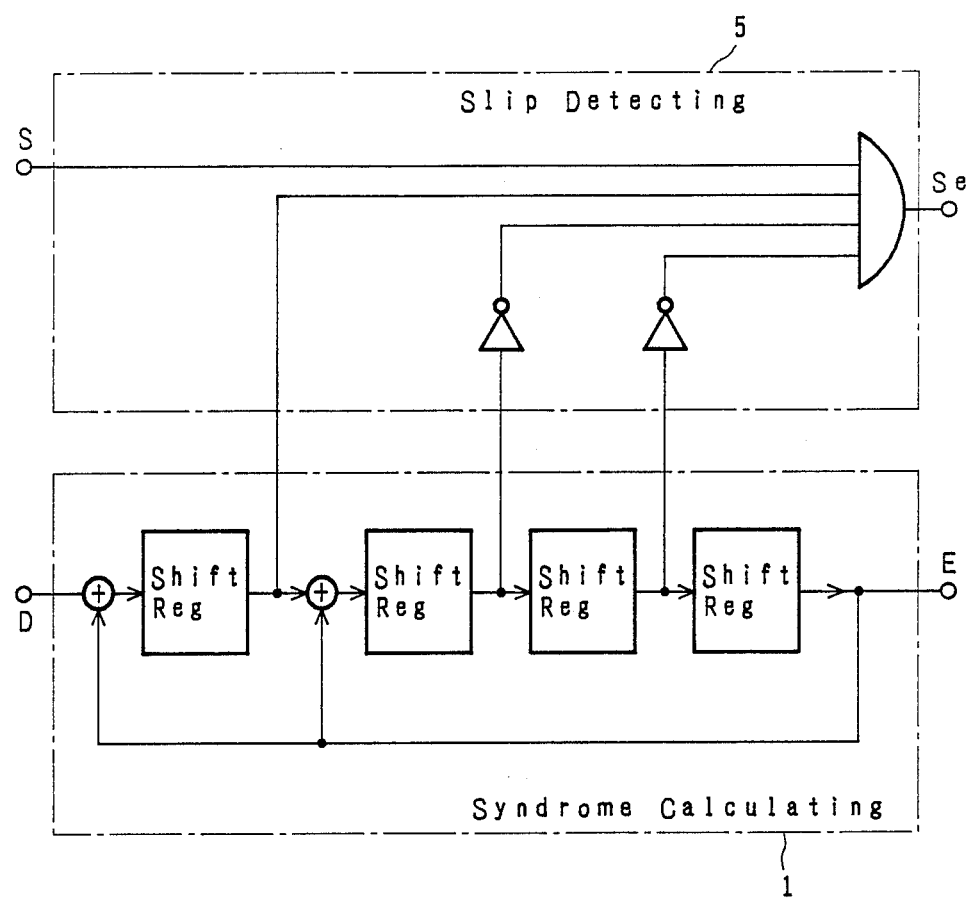
FIG. 4 is a circuit diagram to show another embodiment of the syndrome calculating circuit and synchronization slip detecting circuit thereof.

FIG. 4 shows a calculating method for a syndrome when a divider circuit is used. As shown in the figure, the divider circuit is provided with plural shift registers. In the above example, the number of shift registers is four. After the completion of the arithmetic operation, the values stored in the shift registers become the vector representation or the remainder. The syndrome calculating circuit 1 shown in FIG. 4 can construct the system as the synchronization slip detection signal occurs when the values at the shift registers are (1000) or (1001) after the completion of the syndrome operation.

This example utilizes the features of cyclic codes wherein the size and location of an error are obtained from the result of syndrome calculation to correct the error in hypercomplex BHC codes obtained by extending the BCH codes into hypercomplex. Synchronization detecting signals can be obtained from the syndrome or the error location obtained therefrom.

Figure 5:
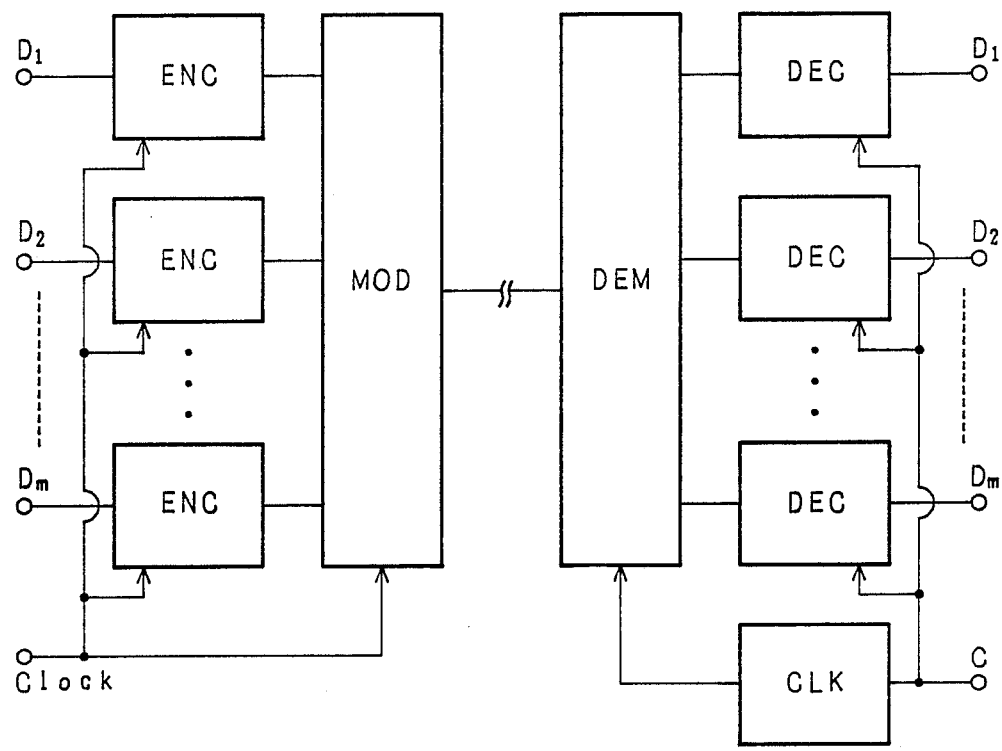
FIG. 5 is a chart to show an embodiment of a structure to which this invention may be applied corresponding to the second aspect of this invention wherein encoders and decoders are inserted for each system respectively.

This invention is applicable to the communication system shown in FIG. 5. In the system shown in FIG. 5, an encoder and a decoder are inserted in each of the m plural systems with the initial phases thereof being identical to each other so that one word synchronization is used commonly for all the signals of the m systems.

Figure 6:
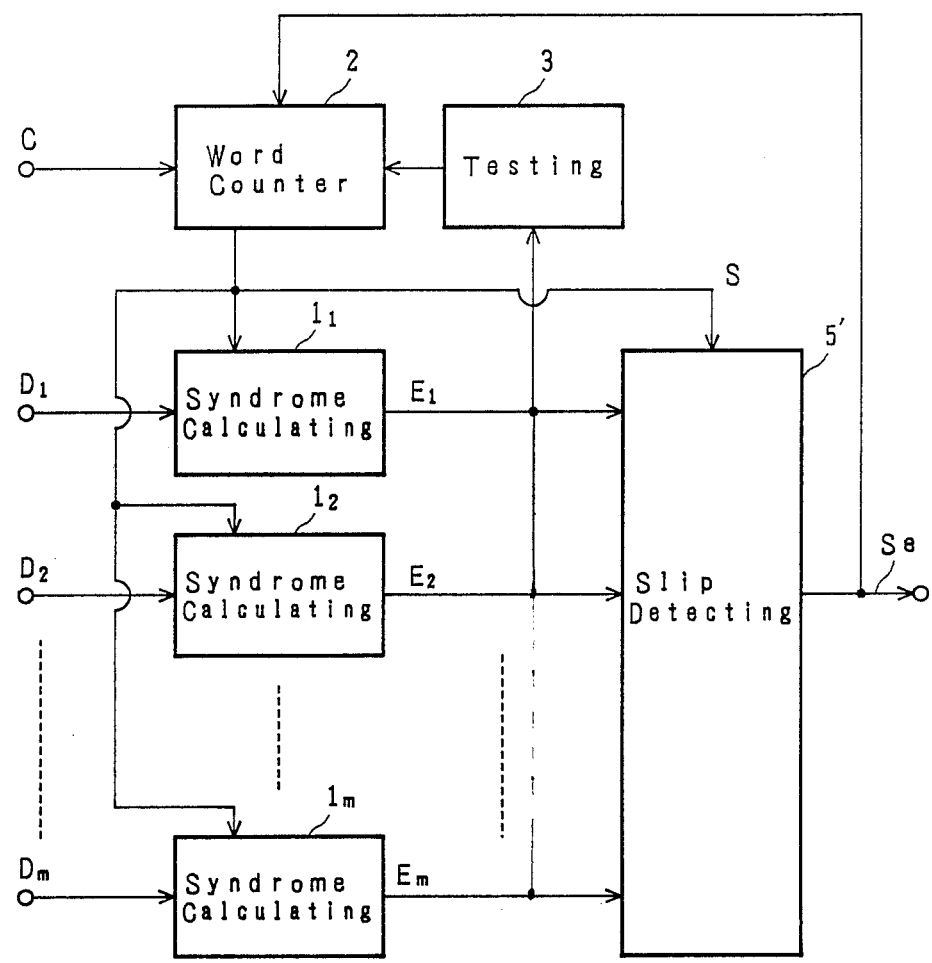
FIG. 6 is a block diagram to show the second embodiment system of this invention (corresponding to the second aspect).
Figure 7:
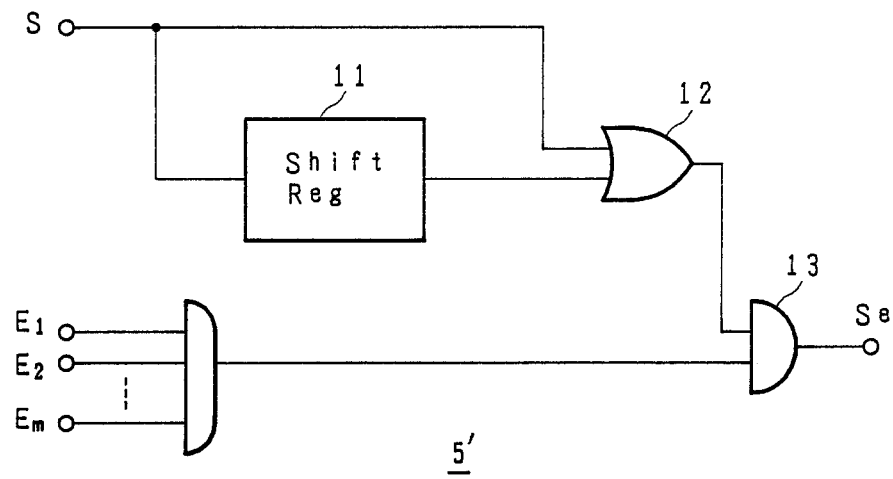
FIG. 7 is a block diagram to show an embodiment of the construction of the synchronization slip detecting circuit.

FIG. 6 is a block diagram of a second embodiment of this invention system applicable to the above. In this embodiment, one each circuit ($1_1$-$1_m$) is provided for m systems to receive the encoded signals including error correction codes and having identical initial phases from the plural m systems and calculates a syndrome from one of the initial phases. A set of a word counter 2 and a testing circuit 3 are provided for each of the m systems as a means for changing the initial phase when the calculated syndrome is not zero until the syndrome becomes zero for the sequence of M. A word synchronization pulse is produced when the syndrome becomes zero for the sequence of M. The system according to this invention also has a synchronization slip detecting circuit 5' which outputs a slip signal of the word synchronization when all the syndromes become a particular value in all the m systems (or the phases of all the word synchronization pulses are detected not to be aligned). 10 FIG. 7 is a block diagram to show the structure of an embodiment of the synchronization slip detecting circuit 5'. The characteristics of this circuit may be understood more easily by comparing it with the one shown in FIG. 2. This embodiment can detect a synchronization slip when error pulses $E_1$ through $E_m$ are output simultaneously for the signals of m systems, without the necessity of counting $K_0$ times of synchronization slip detection.

Figure 8:
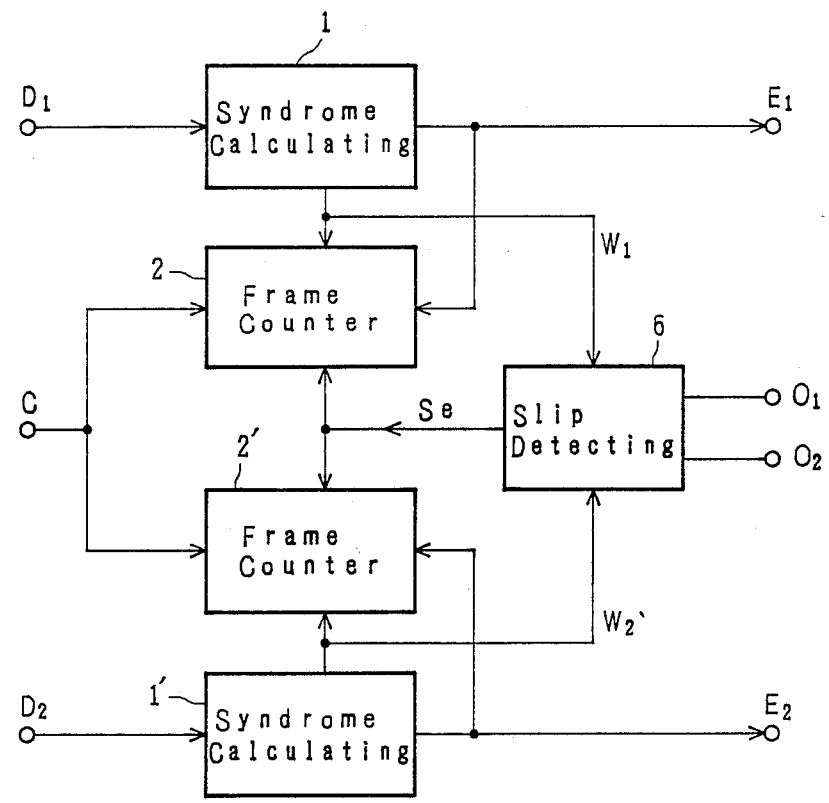
FIG. 8 is a block diagram to show the third embodiment system of this invention (corresponding to the third aspect).

FIG. 8 is a block diagram to show a third embodiment of this invention. A synchronization slip is detected according to this embodiment by making use of the fact that, if normal word synchronization is established for the signals of plural m systems of which initial phases are identical to each other, the phases of the word synchronization pulses become constantly identical to each other.

FIG. 8 shows the case where m=2 or wherein syndromes are calculated for two data inputs $D_1$ and $D_2$ by the circuits 1 and 1'. When the syndromes are not zero respectively, the syndrome calculating circuits 1 and 1' output error pulses $E_1$ and $E_2$. More particularly, each of the systems includes a circuit 1 or 1' which receives encoded signals including error correction codes and having identical initial phases from the plural m systems, and a frame counter 2 or 2' which includes means to change the initial phases when the calculated syndrome is not zero until the syndrome becomes zero for the sequence of M times. Means which issues word synchronization pulses when the syndrome becomes zero for the sequence of M times. This invention also includes a synchronization slip detecting circuit 6 which detects whether or not all the phases of the word synchronization pulses are identical to each other in all the m systems, and outputs synchronization slip signals when they are not identical.

Figure 9:
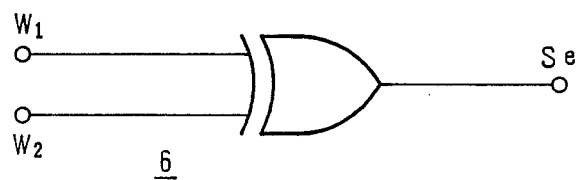
FIG. 9 is a circuit diagram to show a synchronization slip detecting circuit thereof.

FIG. 9 shows a structural view of such a synchronization slip detecting circuit as an exclusive - OR gate, wherein if the phase of word synchronization is aligned with the inputs from the plural m systems (the number of m is 2 in this embodiment), the circuit does not produce any output, but when there is any system of which phase is not identical to the same, it outputs the synchronization slip output Se from the output thereof.

Figure 10:
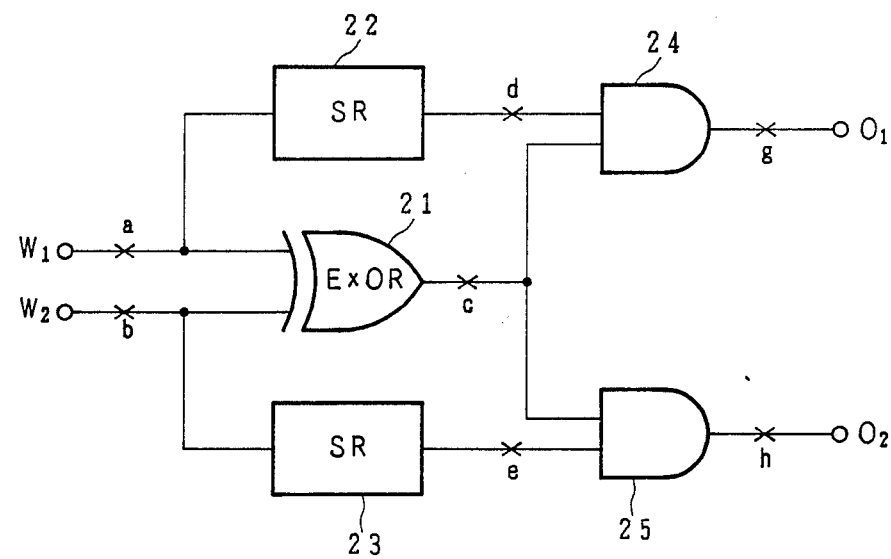
FIG. 10 is a circuit diagram to show a decision circuit included in the synchronization slip detecting circuit for discriminating a system of synchronization slip.

FIG. 10 is a block diagram to show an embodiment of a decision circuit which discriminates a system where synchronization is not established. The decision circuit is included within the synchronization slip detecting circuit 6 to control the frame counter 2 or 2' with the output thereof $0_1$ or $0_2$. The circuit may be constructed with an exclusive OR 21 which receives word synchronization pulses from the systems as inputs, shift registers which shift the word synchronization pulses of each system by one bit, and two AND gates 24, 25 which receive as inputs the outputs from the shift registers and the outputs from the exclusive OR gate 21.

Figure 11:
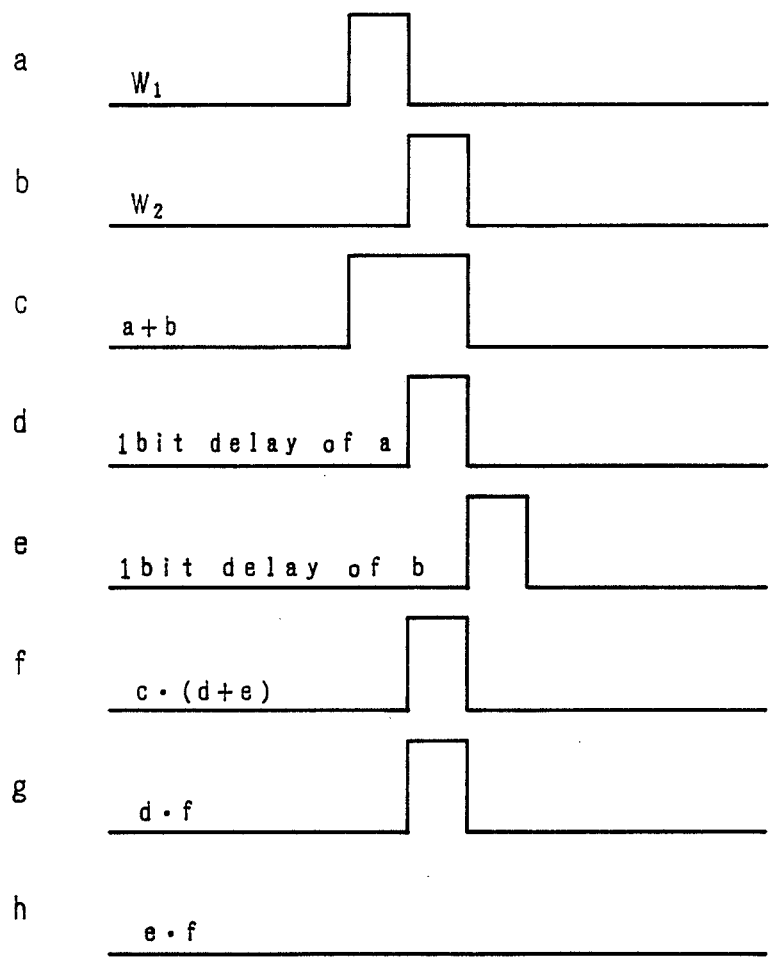
FIG. 11 is a chart to show signal waveforms for describing the performance of the decision circuit.

FIG. 11 is a chart to show the performance of the above circuit wherein the letters a through h denote signal waveforms at the points marked with crosses in FIG. 10. If it is assumed that there is a synchronization slip at the word synchronization pulse $W_1$ but is normal at the pulse $W_2$, the output from the exclusive OR 21 becomes like the one denoted with the letter c, the signals delayed by one bit by shift registers respectively as the ones denoted with the letters d and e, and the signals indicating synchronization slip are issued to the outputs of the AND 24 as shown by the letter g. No signal indicating a synchronization slip is output at the output of the AND 25 as shown by the letter h.

When the synchronization slip detection output Se is output, the word counter (2 or 2') changes the initial phase of the particular system which is judged as a synchronization slip (e.g. by shifting it by one bit). Alternatively, it resets the counter to reset the word synchronization. The circuit may be structured to execute the above two operations simultaneously.

When the number of the sync-in testing circuit stages is assumed to be M, the probability of a synchronization slip is $(\frac{1}{2})^M$. On the other hand, if it is assumed that the number of the sync-in testing circuit stages is N in word synchronization circuits of m systems, the probability of generating a synchronization slip in the m systems simultaneously becomes $(\frac{1}{2})^{mM}$, which is an extremely small value. As the word synchronization establishes a synchronous state by shifting in the units of a bit, synchronization slip is often caused one bit before the correct initial phase. Therefore, the word synchronization may be established more quickly by shifting it by one bit.

When the slip is caused one bit after the normal word synchronization phase or when the slip is caused in the plural systems simultaneously, a normal synchronization slip is established after shifting one bit, and is reset by a conventional testing circuit.

As described in the foregoing statement, this invention synchronization slip detecting circuit can quickly detect slips in synchronization for the signals of m systems to quickly recover the word synchronization.

Figure 12:
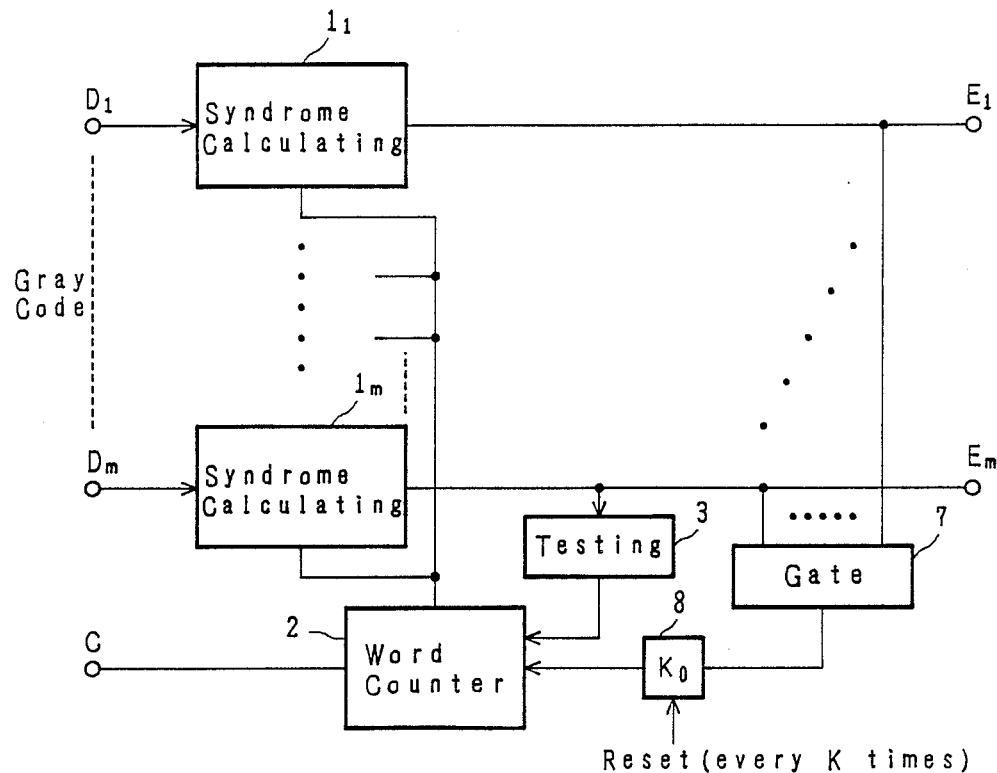
FIG. 12 is a block diagram to show the fourth embodiment system according to this invention (corresponding to the fourth aspect which utilizes Gray codes).
Figure 13:
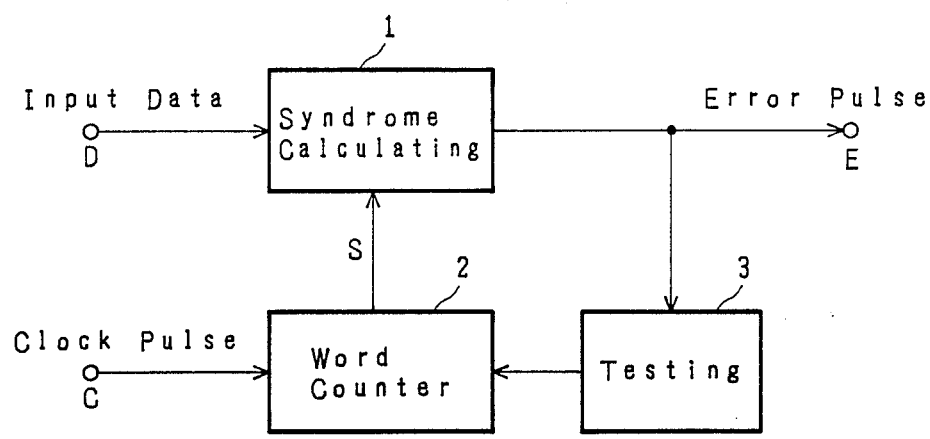
FIG. 13 is a block diagram to show a prior art circuit.

FIG. 12 is a block diagram to show a fourth embodiment of this invention wherein this invention is applied to multi-level modulated signals obtained by encoding the signals with a known Gray code. In FIG. 12, multi-level signals which have been encoded with error correction codes for each system and converted into Gray codes are input in parallel at m input terminals $D_1$ through $D_m$. The signals of the terminals $D_1$ through $D_m$ to be calculated from a certain initial phase with the word synchronization pulse are issued from a common word counter 2. When the syndromes calculated by the circuits are not zero, the initial phase of the particular circuit is altered to calculate the syndrome anew and the operation is repeated until the particular syndrome becomes zero for the sequence of M times. A testing circuit 3 is provided as the controlling means for the above operation. A synchronization slip detecting circuit comprises a gate circuit 7 which detects simultaneous generation of the signals at the plural systems indicating the location of code errors in each system and a testing counter which outputs a synchronization slip output in word synchronization when the output of the above circuit is detected more than $K_0$ times in the sequence of K ($K_0 \leq K \leq M$).

The gate 7 generates its output when it receives inputs simultaneously at more than two inputs out of the m inputs thereof. The counter 8 is a testing counter which counts the outputs from the gate 7 and which is reset every time the syndrome calculating circuits $1_1$ through $1_m$ run their operation for K times, and starts the outputs when the counted number reaches $K_0$. Synchronization slip is detected by utilizing the fact that when signals from m systems arrive to cause a slip, a synchronization slip is always caused at more than two systems in the case of Gray codes obtained by encoding signals with error correction codes separately for each of the systems.

When the output of the testing counter indicates the output of a synchronization slip, the word counter executes either one or both of the operations; i.e. to change the initial phase or to reset the word counter to establish the word synchronization anew.

When the word synchronization is established by shifting one-bit by one-bit, a slip is often caused one bit before the initial phase. In such a case, the first method mentioned above can establish synchronization more quickly than the second method. When a slip is caused one bit after the correct initial phase, the word counter 2 is reset by the operation similar to the conventional method with a testing circuit 3 after shifting it by one bit. As mentioned above, a synchronization slip can be detected quickly by using the characters of codes effectively.

Figure 14:
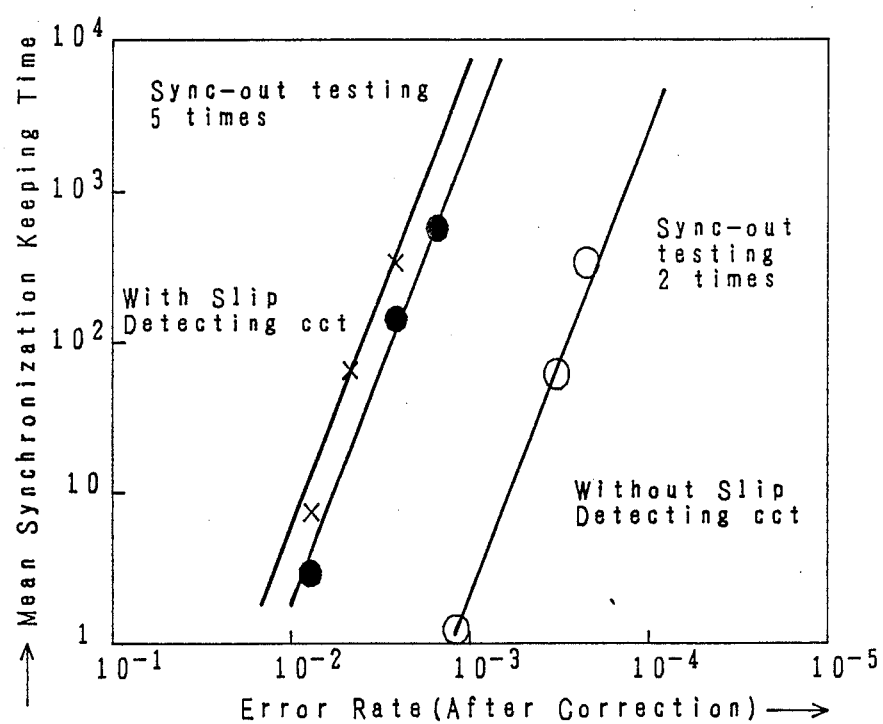
FIG. 14 is a graph to explain the effect of this invention in actual measurement for keeping synchronization.

Effects of this invention will now be demonstrated by the actually measured values. FIG. 14 is a table to show the measurement relation between the error rate and the mean synchronization keeping time with or without a synchronization slip detecting circuit by using 0256 QAM MODEM which incorporates LSI for double error correction BCH having the code length of 255. The average time from the time when a random error by noise was applied to a normal synchronized state to the time when synchronization was detected slipping by slip detection was measured. It was found that when the number of sync-out testing circuit stages is two, synchronization slip with BER is as low as about. $1 \times 10^{-4}$ after correction. It was determined that the appropriate number of the sync-out testing stages was five or higher. The frequency of the clock signal was 12.5 MHz. The table shows a comparison of the above with the case where the number of the sync-in testing circuit stages is five. When the number of the stages was two, the maximum time for synchronization was 11.6 msec and caused no problems. Due to inappropriate sync-out testing stages, however, it cannot be used practically. When the number of sync-out testing circuit stages is increased to five, there are not difficulties in synchronization keeping time, but the time for setting synchronization increases to make the use impractical as shown in the table. When a synchronization slip detecting circuit is utilized, on the other hand, as it needs only counting error pulses when a slip is caused, the average synchronization keeping time can be maintained at a sufficiently high level at the normal state while the time needed for establishment of final synchronization can be reduced to 4.6 msec.

| Synchronization Time (When the number of sync-in testing stages is five) | | | |
|---|---|---|---|
| Synchronization slip detecting circuit | No | No | Yes |
| Number of sync-out testing circuit stages | 2 | 5 | 5 |
| Maximum time for synchronization (measured) | 11.6 msec | Extremely high | 4.6 msec |
| Average time for synchronization (calculated)* | 3.1 msec | 21000 msec | 2.77 msec |

*One time of synchronization slip

As described in detail in the foregoing statement, in addition to the synchronization slip made by conventional testing counters, another synchronization slip detecting circuit is provided in this invention to quickly detect the slip in synchronization to thereby enable resetting of the phase of resetting of the synchronization counter. As the synchronization slip detecting circuit is least likely to be actuated with bit errors in transmitted signals, synchronization can be maintained stably without slipping therefrom because of bit errors.

Although only a few embodiments have been described in detail above, those having ordinary skill in the art will certainly understand that many modifications are possible in the preferred embodiments without materially departing from the advantageous teachings thereof.

For instance, while the syndrome has been described as being a zero, it could equally likely be any other value indicative of a syndrome. All such modifications are intended to be accompanied within the following claims.

What is claimed is:

1. A word synchronization system comprising:
   circuit means, receiving encoded signals including error correction codes as an input, for calculating a syndrome indicative of a synchronization state, out of one initial phase;
   controlling means, for:
   (1) changing a current phase of said circuit means when the syndrome calculated by said circuit means is not a predetermined value indicative of synchronization,
   (2) obtaining a new syndrome at a changed phase, and
   (3) repeating the operations (1) and (2) until the syndrome becomes said predetermined value for a sequence of M times; and
   synchronization slip detecting means, for determining a synchronization slip in the word synchronization when a particular syndrome is repeatedly detected for $K_0$ times out of a sequence of K times in the outputs from said circuit means, where $K_0 \leq K \leq M$.

2. A word synchronization system comprising:
   a plurality of circuit means, which are provided one each for each of m systems respectively, and receive as input encoded signals including error correction codes and having initial phases identical to each other from said m systems, each for calculating a syndrome indicative of a synchronization state out of one initial phase of said encoded signal;
   means for changing said initial phase whenever the calculated syndrome is not a predetermined value, and until said syndrome becomes the predetermined value for a sequence of M times;

means, provided one each for said m systems to generate word synchronization pulses when the syndrome becomes zero for the sequence of M times; and synchronization slip detecting means, for determining a synchronization slip in word synchronization when all of said synchronization syndromes for said m systems are a particular syndrome.

3. A word synchronization system comprising a plurality of circuits, which receive encoded signals which include error correction codes and have identical initial phases to each other from plural m systems and which calculate a syndrome indicative of a synchronization state, of one initial phase;

means for changing said initial phase when the syndrome calculated by said circuit is not a predetermined value and for repeatedly changing said initial phase until the syndrome becomes said predetermined value over a sequence of M times;

means for generating word synchronization pulses when the syndrome becomes said predetermined value for the sequence of M times; and synchronization slip detecting means for detecting whether or not all the word synchronization pulse phases are aligned to each other for all of said m systems and for producing a synchronization slip output if not.

4. A word synchronization system comprising;

a circuit, which receives encoded signals with error correction codes which have been encoded for each of a plurality of systems separately and then converted into Gray codes, for calculating a syndrome indicative of a synchronization state of one initial phase;

controlling means for changing the initial phase of said circuit when the calculated syndrome is not a predetermined value and repeating the operation until the syndrome becomes the predetermined value for the sequence of M times; and synchronization slip detecting means comprising a gate circuit which detects simultaneous generation of signals indicating locations of code errors in the plural systems and a testing counter for producing a slip of word synchronization signal when the output from said gate circuit is detected for more than $K_0$ times in a sequence of K times where $(K_0 \leq K \leq M)$.

5. The word synchronization system as claimed in one of claims 1 through 4 further comprising means for changing an initial phase when a synchronization slip decision output is detected.

6. The word synchronization system as claimed in one of the claims 1 through 4 further comprising means for resetting word synchronization when a synchronization slip decision output is detected.

7. The word synchronization system as claimed in one of the claims 1 through 4 wherein said predetermined value is zero.

8. A method of word synchronization comprising the steps of:

receiving encoded signals including error correction codes as an input, and calculating a syndrome indicative of a synchronization state, out of one initial phase;

changing a current phase of said circuit means when the syndrome calculated by said syndrome calculating step is not a predetermined value indicative of synchronization;

obtaining a new syndrome at a changed phase;

repeating said changing and obtaining steps until the syndrome becomes said predetermined value for a sequence of M times; and determining a synchronization slip in the word synchronization when a particular syndrome is repeatedly detected for $K_0$ times out of a sequence of K times, where $K_0 \leq K \leq M$.

* * * * *